June 19, 1962  A. H. B. WALKER  3,040,239
ELECTRICAL CONTROL APPARATUS
Filed July 14, 1958  2 Sheets-Sheet 1

WITNESSES
Leon J. Laza
Clement L. McHale

INVENTOR
Alec H. B. Walker
BY
F. E. Browder
ATTORNEY

United States Patent Office 3,040,239
Patented June 19, 1962

3,040,239
ELECTRICAL CONTROL APPARATUS
Alec H. B. Walker, Radlett, Harts, England, assignor to Westinghouse Electric Corporation, East Pittsburgh, Pa., a corporation of Pennsylvania
Filed July 14, 1958, Ser. No. 748,357
11 Claims. (Cl. 323—24)

This invention relates to electrical control apparatus and more particularly to regulator systems.

In order to vary or control the voltage across a load circuit supplied from a source of alternating current or to maintain the voltage across the load circuit at substantially a predetermined value, various types of conventional continuously variable inductive devices have been employed in the past. Such inductive devices include variable transformers of the sliding-brush type, inductive regulators and saturable reactors or magnetic amplifiers. These conventional devices are usually connected between the source of alternating current and the load circuit, and either on the primary or secondary side of an associated transformer and operate to regulate the voltage applied to the load circuit. The first two types of inductive devices mentioned above include moving parts and require periodic maintenance while the last type of device mentioned has the disadvantages of large size and weight and a relatively poor power factor. It is therefore desirable to provide a means of controlling the voltage across a load circuit supplied from a source of alternating current which does not include moving parts and which allows a continuously variable control of the voltage across a load circuit without introducing appreciable losses or impedance.

It is an object of this invention to provide a new and improved electrical control apparatus for controlling the voltage across a load circuit supplied from a source of alternating current.

Another object of this invention is to provide a new and improved regulator system for maintaining at substantially a predetermined value the voltage across a load circuit supplied from a source of alternating current.

A further object of this invention is to provide an electrical control apparatus for controlling the voltage across the load circuit supplied from a source of alternating current through a transformer by applying control signals to semiconductor switching devices to thereby change tap connections on said transformer during each half cycle of said alternating current.

Other objects of the invention will in part be obvious and will in part appear hereinafter.

For a fuller understanding of the nature and objects of the invention reference should be had to the following detailed description taken in connection with the accompanying drawings, in which.

Figure 1:
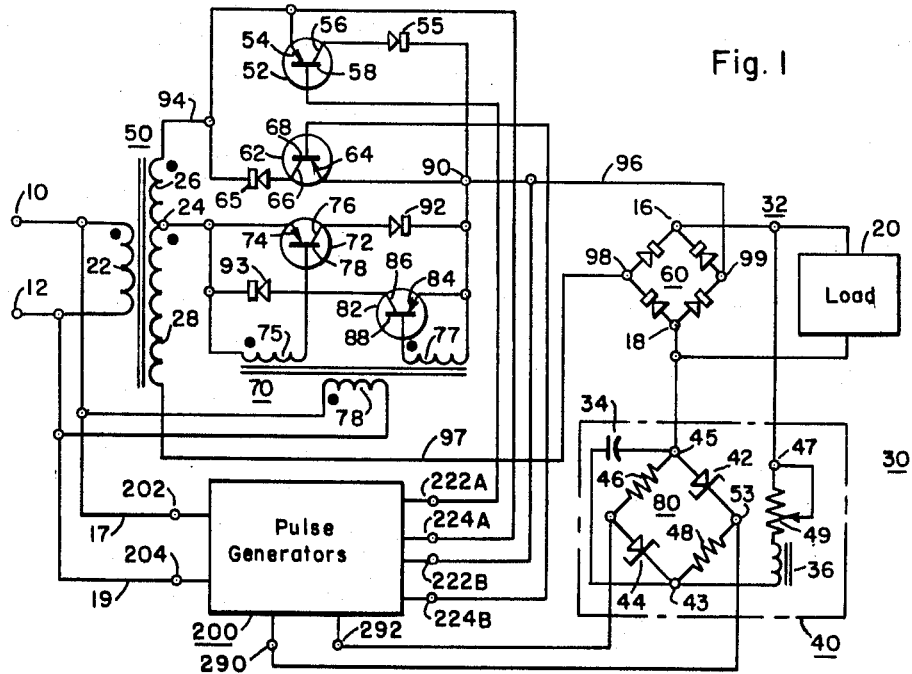
FIGURE 1 is a schematic diagram of circuits and apparatus illustrating a preferred embodiment of this invention.

Referring now to the drawing and FIG. 1 in particular, there is illustrated an electrical control apparatus, specifically a regulator system or loop 30, for maintaining at substantially a predetermined value the voltage across a load circuit 32 which includes a full-wave rectifier 60 and a load 20 and which is supplied electric power from a source of alternating current (not shown) connected at the input terminals 10 and 12 through the transformer 50. The transformer 50 includes a primary winding 22, connected to the input terminals 10 and 12, and secondary winding sections 26 and 28 which make up a secondary winding having a first tap connection 24 intermediate the ends of the secondary winding and a second tap connection 94 which is formed by the upper end of the secondary winding section 26. The lower end of the secondary winding section 28 is connected directly to the load terminal 98 of the load circuit 32 by the conductor 97. In general, the first tap connection 24 is connected by a first plurality of semiconductor switching devices, specifically the P–N–P junction transistors 72 and 82, upon the application of control voltages from the transformer 70, and the second tap connection 94 is connected to the load circuit 32 by a second plurality of semiconductor switching devices, specifically the P–N–P junction transistors 52 and 62, upon the application of certain control signals from the pulse generating means 200.

The regulator system 30 includes an error detecting means or circuit 40 for obtaining an error voltage which is a measure of the deviation of the voltage across the load circuit 32 from a predetermined value. The error detecting means 40 is connected between the load circuit 32 and the pulse generating means 200 to control the operation of the pulse generating means 200 in response to said error voltage. The pulse generating means 200, in turn, controls the conduction of the transistors 52 and 62 to thereby change the connection between the load circuit 32 and the transformer 50 from the first tap connection 24 to the second tap connection 94 at a predetermined point during each half cycle of alternating current from the source (not shown) connected at the input terminals 10 and 12. The operation of the switching transistors 72 and 82 is controlled in general by the application of control voltages to said transistors from the transformer 70.

In particular, the switching transistors 72 and 82, which comprise the first plurality of semiconductor switching devices, each includes a plurality of electrodes. The transistor 72 includes a base 78, an emitter 74 and a collector 76. The transistor 82 includes a base 88, an emitter 84 and a collector 86. The emitter-collector paths of the transistors 72 and 82 are connected in parallel circuit relationship between the first tap connection 24 and the common terminal 90 which, in turn, is connected to the load terminal 99 by the conductor 96. The first tap connection 24 is connected to the terminal 90 through a first circuit which includes the emitter 74 and the collector 76 of the transistor 72 and the diode 92. The tap connection 24 is connected to the common terminal 90 through a second circuit which includes the diode 93, the collector 86 and the emitter 84 of the transistor 82. The transformer 70, having a primary winding 78 connected to the input terminals 10 and 12 and secondary windings 75 and 77, is provided for applying control voltages between the base and the emitter of each of the transistors 72 and 82, respectively. The secondary winding 75 is connected between the emitter 74 and the base 78 of the transistor 72. The secondary winding 77 is connected between the emitter 84 and the base 88 of the transistor 82. The voltages applied between the base and the emitter of each of the transistors 72 and 82, respectively, by the transformer 70, are substantially 180° out of phase. The control voltages applied by the transformer 70 to the transistors 72 and 82 render one of said transistors conducting on each half cycle of the alternating current from the source (not shown) connected to the input terminals 10 and 12. The diodes 92 and 93 are poled to permit conduction in the forward direction in the emitter-collector paths of the transistors 72 and 82 respectively, on alternate half cycles of said alternating current.

The second plurality of semiconductor switching devices includes the transistor 52 having a base 53, an emitter 54 and a collector 56, and the transistor 62 having a base 68, an emitter 64 and a collector 66. Similarly to the transistors 72 and 82, the emitter-collector paths of each of the switching transistors 52 and 62 are connected in parallel circuit relation between the second tap connection 94 and the common terminal 90 which, in turn, is connected to the same side or load terminal 99 of the load circuit 32 as the transistors 72 and 82. The first circuit between the second tap connection 94 and the common terminal 90 includes the emitter 54 and the collector 56 of the transistor 52 and the diode 55. A second circuit between the second tap connection 94 and the common terminal 90 includes the diode 65, the collector 66 and the emitter 64 of the transistor 62. The emitter 54 and the base 58 of the transistor 52 are connected to the output terminals 224A and 222A respectively of the pulse generating means 200. The emitter 64 and the base 68 of the transistor 62 are connected to the output terminals 222B and 224B, respectively, of the pulse generating means 200. The control pulses applied between the base and the emitter of each of the transistors 52 and 62 from the pulse generating means 200 cause one of said transistors to conduct on alternating half cycles of the alternating current from the source (not shown) connected at the terminals 10 and 12 at a predetermined point during the respective half cycles of said alternating current. The diodes 55 and 65 are also poled to permit conduction in the forward direction through the emitter-collector paths of the transistors 52 and 62, respectively, on alternate half cycles of said alternating current. The transistors 52 and 63 are therefore connected to conduct at a predetermined point during alternate half cycles of said alternating current upon the application of control pulses from the pulse generating means 200 to thereby substantially connect the second tap connection 94 to the load terminal 99 of the load circuit 32.

Figure 2:
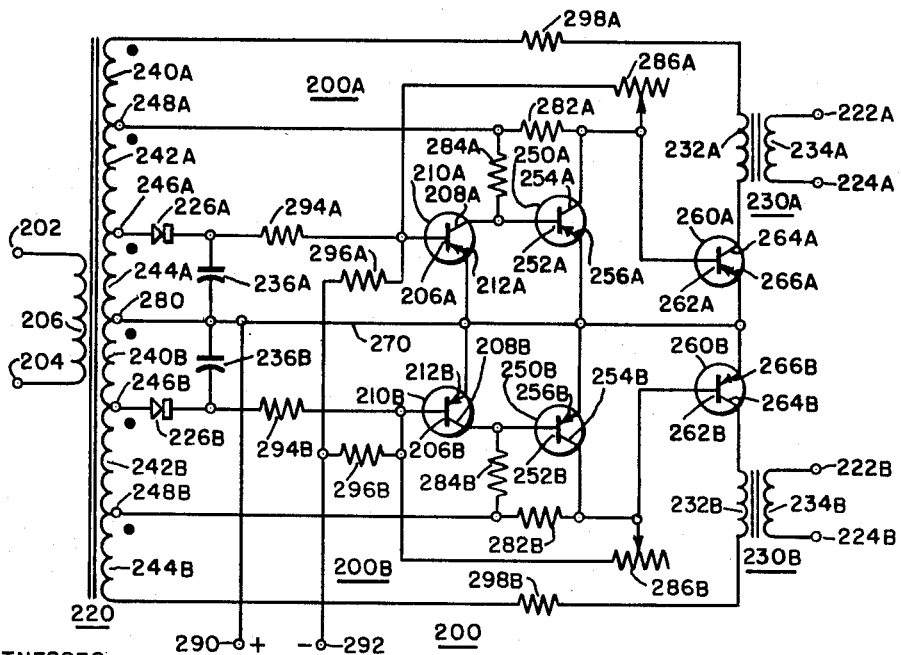
FIG. 2 is a schematic diagram of circuits and apparatus of the pulse generating means shown in FIG. 1.

Referring to FIG. 2, there is illustrated circuits and apparatus suitable for use as the pulse generating means 200, shown in FIG. 1. The pulse generating means 200, shown in FIG. 2, comprises two pulse generating sections 200A and 200B which each produce output control pulses which are substantially 180° out of phase. The circuits and components of the pulse generating sections 200A and 200B are substantially identical, with the corresponding components of the pulse generating section 200B including the reference letter B rather than the reference letter A. For convenience, the pulse generating section 200A will be described and its operation explained. It is to be understood that the pulse generating section 200B includes the same components and a similar circuit with the connections suitably reversed or modified to produce control pulses which are 180° out of phase with the control pulses provided by the pulse generating section 200A.

In particular, the pulse generating means 200 includes an input transformer 220 having a primary winding 206 connected to the input terminals 202 and 204 which, in turn, are connected to the source of alternating current at the input terminals 10 and 12 through the conductors 17 and 19. The transformer 220 includes six secondary winding sections 240A, 242A, and 244A, which form part of the pulse generating section 200A and the three corresponding secondary winding sections 240B, 242B and 244B, which form part of the pulse generating section 200B. The six secondary winding sections of the transformer 220 form a single secondary winding having a mid-tap connection at the terminal 280 to which is connected the conductor 270.

The pulse generating section 200A includes three switching transistors of the P-N-P junction type 210A, 250A and 260A and an output transformer 230A which are connected in circuit relation with the secondary winding sections 240A, 242A and 244A to produce at the output terminals 222A and 224A of the pulse generating section 200A control pulses at a predetermined point during alternate half cycles of the alternating current from the source (not shown) connected at the input terminals 10 and 12. The predetermined point during the alternate half cycles varies with the error voltage applied at the control terminals 290 and 292 of the pulse generating means 200.

The first switching transistor 210A of the pulse generating section 200A includes a base 206A, a collector 208A and an emitter 212A. The emitter 212A of the transistor 210A is connected to the mid-tap connection 280 of the secondary winding sections of the transformer 220 through the conductor 270. The base 206A of the transistor 210A is connected to the common terminal 246A between the secondary winding sections 242A and 244A through the resistor 294A and the diode 226A. A capacitor 236A is connected between the mid-tap connection 280 through the conductor 270 and the common terminal between the diode 226A and the resistor 294A. The collector 208A of the transistor 210A is connected to the common terminal 248A between the secondary winding sections 240A and 242A through a current limiting resistor 284A. In order to apply the error voltage from the error detecting means 40 between the base 206A and the emitter 212A of the transistor 210A, the control terminal 290 is connected to the emitter 212A through the conductor 270, and the control terminal 292 is connected to the base 206A through a resistor 296A.

In order to amplify any pulses of current flowing in the emitter-collector path of the transistor 210A, the output of the transistor 210A is coupled to the transistor 250A having a base 252A, a collector 254A and an emitter 256A. The emitter 256A of the transistor 250A is connected to the mid-tap connection 280 through the conductor 270. The base 252A of the transistor 250A is connected to the common terminal between the collector 208A of the transistor 210A and the resistor 284A. The collector 254A of the transistor 250A is connected to the terminal 248A between the secondary winding sections 240A and 242A of the transformer 220 through the current limiting resistor 282A. In order to provide positive or regenerative feedback in the pulse generating section 200A, a variable resistor 286A is connected between the collector 254A of the transistor 250A and the base 206A of the transistor 210A.

In order to amplify the output current of the transistor 250A, the output of the transistor 250A is coupled to the transistor 260A having a base 262A, a collector 264A and an emitter 266A. The emitter 266A is connected to the center-tap connection 280 through the conductor 270. The base 262A of the transistor 260A is connected to the terminal 248A between the winding sections 240A and 242A through the resistor 282A. The collector 264A of the transistor 260A is connected to the upper end of the secondary winding section 240A through a series circuit which includes the primary winding 232A of the output transformer 230A and a resistor 298A. The output current of the transistor 260A is coupled to the output terminals 222A and 224A of the pulse generating section 200A by the output transformer 230A which includes the primary winding 232A and the secondary winding 234A which is connected directly to the output terminals 222A and 224A.

The operation of the pulse generating section 220A of the pulse generating means 200 will now be described. During the first half cycle of operation it will be assumed that the upper end of each of the secondary winding sections 240A, 242A and 244A is at a positive potential with respect to the potential at each of the lower ends of each of said secondary winding sections. During this half cycle of operation the capacitor 236A will charge up to a voltage near the maximum value of the voltage across the secondary winding section 244A, the charging current flowing from the terminal 246A between the secondary winding sections 242A and 244A, through the diode 226A to the upper side of the capacitor 236A, which will assume a positive potential with respect to the lower side of the capacitor 236A which is connected to the mid-tap connection 280. During this half cycle of operation, the base 206A of the transistor 210A will be positive with respect to the emitter 212A of the transistor 210A during substantially the entire half cycle. This is because the magnitude of the error voltage at the terminals 290 and 292 is substantially less than the magnitude of the voltage across the secondary winding section 244A which is applied substantially between the base 206A and the emitter 212A of the transistor 210A and has a polarity during the assumed half cycle which opposes the error voltage at the terminals 290 and 292. A very small current will flow in the emitter-collector path of the transistor 210A due to the voltage across the secondary winding sections 242A and 244A which is applied between the emitter 212A and the collector 208A of the transistor 210A through the resistor 284A. The input current to the transistor 210A, which will flow from the collector 208A, acting as an effective emitter, to the base 206A will be limited to a very low value by the resistors 284A and 294A and the diode 226A, which are all effectively connected in series with the collector-base path of the transistor 210A during the assumed half cycle of operation, the diode 226A being poled in the reverse direction during the assumed half cycle.

During the assumed half cycle of operation when the transistor 210A is conducting a very low current, the transistor 250A will also be conducting a very low current in its emitter-collector path, since the potential at the base 252A is nearly the same as the potential at the terminal 248A between the secondary winding sections 240A and 242A which is positive with respect to the potential at the emitter 256A, and the voltage at the collector 254A is only slightly positive with respect to the voltage at the base 252A of the transistor 250A. The input current to the transistor 250A during the assumed half cycle is limited by the resistor 282A. During the assumed half cycle of operation, the transistor 260A is also conducting a very low current, since the voltage drop across the resistor 282A due to the current flow in the transistor 250A is very small, and the potential at the base 262A is only slightly less positive than the potential at the terminal 248A which is positive with respect to the potential at the emitter 266A of the transistor 260A and the voltage at the collector 264A is only slightly positive with respect to the voltage at the base 262A of the transistor 260A. The input current to the transistor 260A during the assumed half cycle is limited by the resistors 298A and 282A. Due to the voltage between the mid-tap connection 280 and the upper end of the secondary winding section 240A, a small reverse current will flow from the upper end of the secondary winding section 240A through the resistor 298A and the primary winding 232A of the transformer 230A and through the emitter-collector path of the transistor 260A in the reverse direction, back to the mid-tap connection 280 through the conductor 270. During the assumed half cycle of operation, a small control output voltage will be coupled to the secondary winding 234A and appear at the output terminals 222A and 224A, the polarity of the output being positive at the terminal 222A with respect to the potential at the terminal 224A.

During the second half cycle of operation of the pulse generating section 200A, it is assumed that the voltage at the lower end of each of the secondary winding sections 240A, 242A and 244A is positive with respect to the voltage at the upper end of the respective secondary winding sections. During the second half cycle of operation, the diode 226A is substantially blocking or non-conducting, since it is now poled in the reverse direction with respect to the assumed polarity of voltage across the secondary winding section 244A. During this half cycle of operation, the voltage at the upper side of the capacitor 236A, which is positive with respect to the voltage at the lower side of the capacitor 236A, will cause the capacitor 236A to discharge through the resistors 294A and 296A, through the error detecting circuit 40 connected at the terminals 290 and 292, and back to the lower side of the capacitor 236A. The voltage at the base 206A of the transistor 210A will remain positive with respect to the voltage at the emitter 212A of the transistor 210A until the voltage between the base 206A and the emitter 212A due to the capacitor 236A decreases because of the discharge of the capacitor 236A to a value slightly below the error voltage applied at the terminals 290 and 292 which, in turn, is applied between the bases 206A and 212A of the transistor 210A, through the resistor 296A. The transistor 210A will remain substantially non-conducting until the net voltage at the base 206A is slightly negative with respect to the voltage at the emitter 212A of the transistor 210A since the voltage at the collector 208A is negative with respect to the voltage at the base 206A of the transistor 210A during the assumed half cycle of operation. The transistor 210A will then begin to conduct saturation current in the emitter-collector path of the transistor 210A, or the transistor 210A will be switched to its "on" condition.

During the assumed second half cycle of operation the transistor 250A will conduct saturation current in the emitter-collector path of the transistor 250A, since the voltage between the emitter 256A and the base 252A of the transistor 250 will be positive at the emitter 256A with respect to the voltage at the base 252A and in excess of a threshold voltage necessary to cause saturation current to flow in the emitter-collector path of the transistor 250A. The saturation current, which flows in the transistor 250A during the assumed half cycle, prior to the change in the conduction state of the transistor 210A, flows from the mid-tap connection 280, through the conductor 270, into the emitter 256A and out of the collector 254A of the transistor 250A, through the resistor 282A and back to the terminal 248A between the secondary winding sections 240A and 242A. After the transistor 210A begins to conduct saturation current, the saturation current in the emitter-collector path of the transistor 210A will flow from the mid-tap connection 280, through the conductor 270, into the emitter 212A and out of the collector, 208A of the transistor 210A, through the resistor 284A and back to the terminal 248A, thereby causing a change in the voltage drop across the resistor 284A. The change in voltage across the resistor 284A reduces the voltage between the base 252A and the emitter 256A of the transistor 250A below the threshold voltage required to cause saturation current to flow in the emitter-collector path of the transistor 250A which will then become substantially non-conducting or cut off. The change in the conduction state of the transistor 250A after the transistor 210A begins to conduct saturation current will be accelerated by the regenerative or positive feedback from the collector 254A of the transistor 250A, through the rheostat 286A, to the base 206A of the transistor 210A, to thereby reduce the transition time between the saturated and cut-off conditions of the transistors 210A and 250A which thereby reduces the power dissipation in said transistors.

During the assumed second half cycle of operation, the transistor 260A is substantially non-conducting or cut off prior to the change in conduction states of the transistors 210A and 250A. This is because the voltage at the collector 264A is negative with respect to the voltage at the base 262A of the transistor 260A, and the voltage between the emitter 266A and the base 262A of the transistor 260A is less than the threshold voltage necessary to cause saturation current to flow in the emitter-collector path of the transistor 260A because of the voltage drop produced across the resistor 282A when saturation current flows in the emitter-collector path of the transistor 250A. When the transistor 250A changes from an "on" condition to a cut-off condition during the assumed half cycle of operation, the voltage drop across the resistor 282A, due to the saturation current flowing in the emitter-collector path of the transistor 250A, will suddenly decrease to thereby increase the voltage between the base 262A and the emitter 266A of the transistor 260A which is positive at the said emitter with respect to the voltage at said base of the transistor 260A. The voltage between the base 262A and the emitter 266A will then increase to a value above the threshold voltage necessary to cause saturation current to flow in the emitter-collector path of the transistor 260A. Saturation current will then flow from the mid-tap connection 280, through the conductor 270, into the emitter 266A and out of the collector 264A of the transistor 260A, through the primary winding 232A of the transformer 230A, and back through the resistor 298A to the upper end of the secondary winding section 240A. A control output pulse will then appear across the secondary winding 234A of the transformer 230A at the output terminals 222A and 224A of the pulse generating section 200A. The polarity of the control output pulse will be negative at the terminal 222A with respect to the voltage at the terminal 224A. The wave form of the output control pulse will have a steep wave front because of the regenerative feedback provided by the rheostat 286A. After the change in the state of conduction of the transistors 210A, 250A and 260A, the transistor 260A will continue to conduct in its emitter-collector path during the balance of the assumed second half cycle of operation.

As stated previously, the pulse generating section 200B operates similarly to the pulse generating section 200A, but produces an output at the terminals 222B and 224B which is substantially 180° out of phase with the output of the pulse generating section 200A because the connections of the transistors 210B, 250B and 260B are, in general, reversed with respect to the transformer 220. The control output pulses of the pulse generating sections 200A and 200B occur at a predetermined point during each half cycle of the alternating current from the source (not shown) connected at the terminals 10 and 12. The predetermined point during each half cycle depends on the magnitude of the error voltage from the error detecting circuit 40 which is applied at the input control terminals 290 and 292 of the pulse generating means 200 and also depends on the time constant or component values of the capacitor 236A and the resistors 294A and 296A and the effetcive resistance in the error detecting circuit 40. The predetermined point during each half cycle at which control pulses appear at the output terminals of the pulse generating means 200 varies with the magnitude of the error voltage applied at the control terminals 290 and 292. Therefore, the relative phase relation between the control output pulses from the pulse generating means 200 and the alternating current from the source connected at the terminals 10 and 12 varies with the error voltage applied to the pulse generating means 200 from the error detecting circuit 40.

In general, the error detecting means or circuit 40 is connected between the load circuit 32 and the pulse generating means 200 to apply an error voltage to the pulse generating means 200 which is a measure of the deviation of the voltage across the load circuit 32 from a desired predetermined value.

In particular, the error detecting means 40 comprises a well-known bridge circuit 80, a rheostat 49 and a conventional filter circuit which includes a capacitor 34 and an inductance 36. The input terminals 45 and 47 of the error detecting circuit are connected across the output terminals 16 and 18 of a full-wave rectifier 60 in the load circuit 32. The input terminals 43 and 45 of the bridge circuit 80 are connected through the inductance 36 and the rheostat 47 to be responsive to the voltage across the load 20 in the load circuit 32. The capacitor 34 is connected across the input terminals 43 and 45 of the bridge circuit 80, and the inductance 36 is connected in series with the rheostat 47 to filter the rectified voltage across the load circuit 32 before it is applied to the bridge circuit 80. The bridge circuit 80 includes two parallel branches, a first branch comprising a semiconductor diode 42 connected in series circuit relationship with the resistor 48 and a second branch comprising the resistor 46 connected in series circuit relationship with a semi-conductor diode 44. The output error voltage of the error detecting circuit 40 appears at the output terminals 51 and 53 of the bridge circuit 80.

In the operation of the error detecting circuit 40, the input terminals 45 and 47 are connected to be responsive to the voltage across the load circuit 32. The rheostat 49 is provided in order to vary the proportion of the voltage across the load circuit 32 that is applied to the bridge circuit 80 at the input terminals 43 and 45 of the bridge circuit 80. During operation, the direct current voltage across the semiconductor diodes 42 and 44 remains substantially constant, since the voltage applied to the diodes 42 and 44 is always of a greater magnitude than the break-down voltage of the semiconductor diodes 42 and 44, which are preferably of the type known to the art as Zener diodes. Since the voltage drop across each of the semiconductor diodes 42 and 44 is substantially equal, there will be no voltage difference existing across the output terminals 51 and 53 of the error detecting circuit 40 when the voltage applied at the input terminals 43 and 45 of the bridge circuit 80 is equal to twice the voltage drop across each of the semiconductor diodes 42 and 44. When, however, the voltage across the input terminals 43 and 45 is either above or below the reference voltage of the bridge circuit 80, which is twice the voltage drop across each of the diodes 42 and 44, then a voltage difference will exist across the output terminals 51 and 53 of the error detecting circuit 40. The polarity of the output voltage of the error detecting circuit 40 at the terminals 51 and 53 will depend upon whether the input voltage is above or below the reference voltage of the bridge circuit 80. In the normal range of operation of the regulator system 30, as illustrated, only one polarity of output voltage from the error detecting circuit 40 is applied to the pulse generating means 200. The rheostat 49 is adjusted initially to obtain the desired magnitude and polarity of the output error voltage from the error detecting circuit 40. The setting of the rheostat 49 is also changed to adjust the regulated value of voltage at which the regulator system 30 maintains the voltage across the load circuit 32. The output terminals 51 and 53 of the error detecting circuit 40 are connected to the input control terminals 292 and 290, respectively, of the pulse generating means 200. The polarity of the error voltage from the error detecting circuit 40 will be positive at the terminal 290 with respect to the voltage at the terminal 292 in the normal range of regulation of the regulator system 30.

Figure 3:
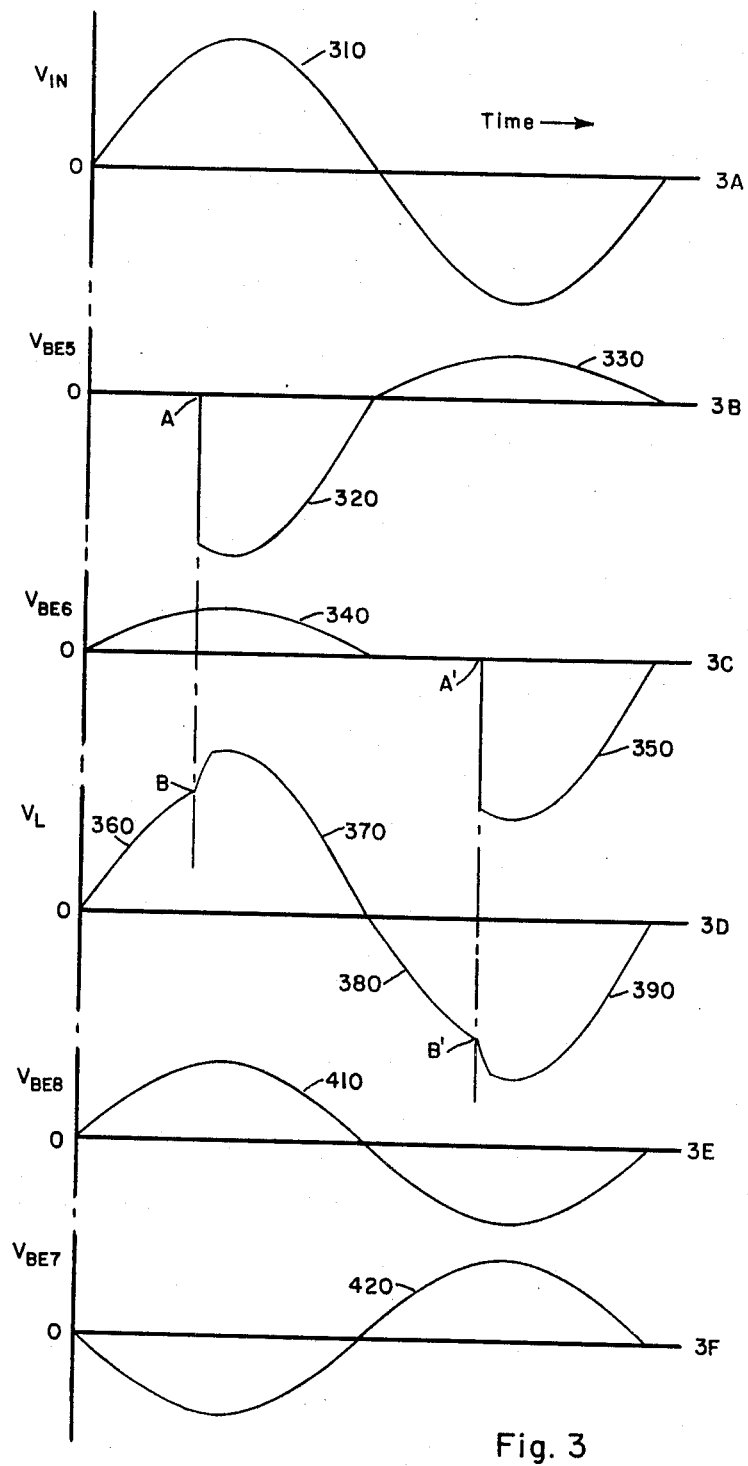
FIG. 3 is a set of wave forms illustrating the operation of the electrical control apparatus shown in FIG. 1.

Referring to FIG. 3, the overall operation of the regulator system 30 will now be considered. Referring to FIG. 3A, the voltage, $V_{IN}$, of the source (not shown) connected at the terminals 10 and 12 is illustrated during one cycle of operation by the curve 310. Referring to FIG. 3B, there is illustrated the corresponding control voltage, $V_{BE5}$, applied between the base 58 and the emitter 54 of the transistor 52 from the pulse generating section 200A of the pulse generating means 200 as indicated by the curves 320 and 330. Referring to FIG. 3C, there is illustrated the control voltage, $V_{BE6}$, applied between the base 68 and the emitter 64 of the transistor 62 from the pulse generating section 200B of the pulse generating means 200 and indicated by the curves 340 and 350. It is to be noted that the control voltages shown in FIGS. 3B and 3C have the same wave shape but are substantially 180° out of phase. Referring to FIG. 3D, there is illustrated the voltage, $V_L$, at the load terminals 98 and 99 at the input of the full wave rectifier 60 as indicated by the curves 360, 370, 380 and 390. Referring to FIG. 3E, the control voltage, $V_{BE8}$, applied between the base 88 and the emitter 84 of the transistor 82 from the secondary winding 77 of the transformer 70 is illustrated by the curve 410. Referring to FIG. 3F, there is illustrated the control voltage, $V_{BE7}$, applied between the base 78 and the emitter 74 of the transistor 72 from the secondary winding 75 of the transformer 70 as indicated by the curve 420.

During the first half cycle of operation of the complete electrical control apparatus shown in FIG. 1, it is assumed that the polarity of the upper end of each of the winding sections 26 and 28 of the transformer 50 is positive with respect to the voltage at the lower end of each of the respective secondary winding sections as shown during the first half cycle of the curve 310 in FIG. 3A. Referring to FIG. 3F, at the beginning of the half cycle of operation it will be seen that the emitter 74 of the transistor 72 will be positive with respect to the base 78, and the transistor 72 therefore will have a relatively low impedance in its emitter-collector path and the transistor 72 will conduct saturation current in its emitter-collector path. The first tap connection 24 is therefore substantially or effectively connected to the load terminal 99 of the load circuit 32. The other side of the load circuit at the load terminal 98 is connected directly to the lower end of the secondary winding section 28 as previously described. Therefore, during the first portion of the assumed half cycle of operation the voltage at the load terminals 98 and 99 will be substantially the voltage between the lower end of the secondary winding section 28 and the first tap connection 24 as shown by the curve 360 in FIG. 3D. Current will flow from the first tap connection 24 into the emitter 74 and out of the collector 76 of the transistor 72, through the diode 92, to the terminal 90, through the conductor 96 to the load terminal 99, through the full-wave rectifier 60 and the load 20 to the load terminal 98, and back to the lower end of the secondary winding section 28. The transistor 82 is substantially non-conducting or cut off during the assumed half cycle of operation. This is because, during this half cycle, the voltage at the base 88 is positive with respect to the voltage at the emitter 84 of the transistor 82 as shown the curve 410 in FIG. 3E. In addition, the diode 94 blocks the flow of current in the emitter-collector path of the transistor 82 during the assumed half cycle of operation until the transistor 52 is turned "on" or becomes conducting.

During the assumed half cycle of operation, the transistor 62 is substantially cut off or non-conducting, since there is a small control voltage applied between the base 68 and the emitter 64 of the transistor 62 from the pulse generating means 200, which is positive at the base with respect to the emitter, as shown by the curve 340 in FIG. 3C. In addition, the diode 65 connected in series with the emitter-collector path of the transistor 62 is substantially blocked and prevents the flow of current in the emitter-collector path during the assumed half cycle to thereby reduce the necessary magnitude of the control voltage from the pulse generating means 200 required to prevent the flow of current in the reverse direction in the emitter-collector path of the transistor 62 during the assumed half cycle of operation. The transistor 52 is also substantially cut off or non-conducting during the first portion of the assumed half cycle of operation prior to the application of a control pulse at a predetermined point during the half cycle as indicated at A in FIG. 3B when the control pulse indicated by the curve 320 is applied between the emitter 54 and the base 58 of the transistor 52. The control pulse from the pulse generating means 200 is positive at the emitter 54 with respect to the polarity at the base 58 of the transistor 52. Therefore, the control pulse causes the transistor 52 to conduct saturation current and substantially connect the second tap connection 94 to the load terminal 99 of the load circuit 32. The control pulse is of sufficient magnitude and duration to cause saturation current to flow in the emitter-collector path of the transistor 52 during the balance of the assumed first half cycle of operation. Since the second tap connection 94 is effectively at a higher voltage than the first tap connection 24, the voltage between the first tap connection 24 and the second tap connection 94 is then impressed across the diode 92 to thereby block the diode 92 and stop conduction of current in the emitter-collector path of the transistor 72. The voltage across the load circuit 32 then increases or commutates from the voltage at the first tap connection 24 to the higher voltage at the second tap connection 94, as shown at the point B in FIG. 3D, and the voltage across the load circuit 32 at the terminals 98 and 99 increases to the higher voltage between the lower end of the secondary winding 28 and the second tap connection 94, as shown by the curve 370 in FIG. 3D.

During the assumed first half cycle of operation it is important to note that current flows from the first tap connection 24 to the load circuit 32 until the control pulse from the pulse generating means 200 causes the transistor 52 to become conducting, and until the potential at the terminal 90 becomes higher than the potential at the tap connection 24 thus causing the diode 92 to block or become non-conducting and interrupt the current flow in the emitter-collector path of the transistor 72. It should also be noted during the assumed half cycle of operation that the control voltage applied to the transistor 82 from the transformer 70 functions to bias the transistor 82 in a substantially non-conducting or cut-off condition as indicated by the curve 410 in FIG. 3E. The diode 93, which is connected in series with the emitter-collector path of the transistor 82, prevents the flow of current in the emitter-collector path of the transistor 82 during the assumed half cycle before the transistor 52 becomes conducting and connects the tap connection 94 to the load circuit 32. After the transistor 52 is turned "on" or becomes conducting during the assumed half cycle, the diode 93 will be poled in the forward direction with respect to the voltage across the winding section 26. The transistor 82, however, will remain substantially non-conducting or cut off during the balance of the assumed half cycle since the voltage at the base 88 of the transistor 82 will be positive with respect to the voltages at the collector 86 and the emitter 84 of the transistor 82 because of the voltages across the secondary winding section 26 and across the secondary winding 77 of the transformer 70, respectively. Since the connection between the load circuit 32 and the tap connection 24 is not transferred or changed to the tap connection 94 until the potential at the terminal 90 has increased to a value above the potential at the tap connection 24, the transfer of connections occurs naturally rather than in a forced manner, thus reducing voltage surges which might otherwise occur. The duration of time required for the transfer of connections between the first tap connection 24 and the second tap connection 94 during the assumed half cycle of operation depends mainly on the reactance of the secondary winding section 26 of the transformer 50.

During the second half cycle of operation, it is assumed that the lower end of each of the secondary winding sections 26 and 28 is at a positive potential with respect to the potential at the upper end of each of the respective secondary winding sections. In general, the overall operation of the circuit shown in FIG. 1, is similar except that the various voltage and currents are substantially 180° out of phase with those previously described.

In particular, the polarity of the alternating current from the source connected at the terminals 10 and 12 is reversed as indicated by the second half cycle of the curve 310 shown in FIG. 3A. The transistor 52 is substantially non-conducting or cut-off, since the diode 55 connected in series with the emitter-collector path of the transistor 52 is now poled in a reverse direction with respect to the voltage across the secondary winding sections 26 and 28. In addition, the control voltage applied between the base 58 and the emitter 54 of the transistor 52 from the pulse generating means 200, as indicated by the curve 330 in FIG. 3B, is positive at the base 58 with respect to the voltage at the emitter 54 during the second half cycle of operation thus biasing or maintaining the transistor 52 in a cut-off condition and preventing the flow of reverse current in the emitter-collector path of the transistor 52. The transistor 72 is also substantially cut off or non-conducting during the assumed second half cycle of operation for several reasons. First, the diode 92 is now blocking or poled in a reverse direction with respect to the voltage across the secondary winding section 28 until the transistor 62 becomes conducting or connects the tap connection 94 to the load circuit 32. In addition, after the transistor 62 becomes conducting and the diode 92 is poled in the forward direction with respect to the voltage across the secondary winding section 26, the transistor 72 remains substantially cut off during the balance of the second half cycle because of the control voltage applied between the base 78 and the emitter 74 of the transistor 72 from the secondary winding 75 of the transformer 70 which is positive at the base 78 with respect to the voltage at the emitter 74, as shown by the second half cycle of the curve 420 in FIG. 3F, and because the voltage applied between the emitter 74 and the collector 76 from the secondary winding section 26 is positive at the emitter 74 with respect to the collector 76.

During the assumed second half cycle of operation the transistor 82 will begin to conduct at the beginning of the second half cycle because of the control voltage applied between the base 88 and the emitter 84 of the transistor 82 from the secondary winding 77 of the transformer 70 as indicated by the second half cycle of the curve 410 in FIG. 3E, which is positive at the emitter 84 with respect to the voltage at the base 88 of the transistor 82. The transistor 82 will conduit saturation current in its emitter-collector path which flows from the lower end of the secondary winding section 28 through the conductor 97, to the load terminal 98 of the load circuit 32, through the full-wave rectifier 60 and the load 20, through the conductor 96 to the terminal 99, into the emitter 84 and out of the collector 86 of the transistor 82, and back to the first tap connection 24, through the diode 94. While the transistor 82 is conducting saturation current, the first tap connection 24 is substantially connected to the load circuit 32, and the voltage across the load circuit 32 will be the voltage associated with the first tap connection 24, as indicated by the curve 380 in FIG. 3D.

During the assumed second half cycle of operation the transistor 62 will be substantially non-conducting or cut off until a control pulse is applied between the base 68 and the emitter 64 of the transistor 62 from the pulse generating means 200 as indicated at the point A' in FIG. 3C. When a control pulse is applied between the base 68 and the emitter 64 of the transistor 62, as indicated by the curve 350 in FIG. 3C, which is positive at the emitter 64 with respect to the potential at the base 68 of the transistor 62, the transistor 62 will begin to conduct saturation current. The potential at the terminal 99 will then become negative with respect to the potential at the first tap connection 24, thus blocking or rendering the diode 93, connected in series with the emitter-collector path of the transistor 82, non-conducting to thereby interrupt the flow of current in the emitter- collector path of the transistor 82. When the transistor 62 begins to conduct saturation current, the connection between the load circuit 32 will change from the first tap connection 24 to the second tap connection 94 of the transformer 50, thus increasing the voltage across the load circuit 32 to the higher voltage associated with the second tap connection 94, as indicated by the curve 390 in FIG. 3D, and occurring substantially at the same predetermined point during the assumed half cycle, as indicated at B' in FIG. 3D, as the beginning of the control pulse as indicated at A' in FIG. 3C. Current then flows from the lower end of the secondary winding section 28 through the conductor 97, to the terminal 98 of the load circuit 32, through the full-wave rectifier 60 and the load 20 to the load terminal 99, through the conductor 96, into the emitter 64 and out of the collector 66 of the transistor 62, and back to the second tap connection 94 through the diode 65.

During the second half cycle of operation the change in the connections between the transformer 50 and the load circuit 32 occurs naturally rather than in a forced manner as previously discussed for the first half cycle of operation. The predetermined point during each half cycle of operation at which the change occurs between the first and second tap connections 24 and 94, respectively, of the transformer 50 is varied in accordance with the error voltage applied to the pulse generating means 200 as previously discussed to thereby vary the voltage applied to the load circuit 32 and maintain the voltage across the load circuit at a predetermined value. It is to be noted that the voltage across the load circuit 32 can be varied continuously between the voltage associated with the first tap connection 24 and the voltage associated with the second tap connection 94. In other words, the phase relation between the alternating current from the source (not shown) connected at the terminals 10 and 12 and the control pulses applied to the switching transistors 52 and 62 from the pulse generating means 200 is varied continuosly in accordance with, or in response to the error voltage from the error detecting means 40 to thereby maintain the voltage across the load circuit 32 at a predetermined value.

It should be noted that the diodes 55, 65, 92 and 93, in addition to only permitting current flow through the emitter-collector paths of the transistors 52, 62, 72 and 82 respectively, during alternate half cycles of operation, also reduce the required magnitude of control voltages necessary to prevent the flow of reverse current in the emitter-collector paths of said transistors provided by the pulse generating means 200 and the transformer 70. It should also be noted that a source (not shown) of biasing voltage is necessary in certain applications to reduce leakage current in the emitter-collector paths of the transistors 52, 62, 72 and 82. The source would be connected in circuit relation with said transistors to apply a voltage between the emitter and the base of the respective transistors which is positive at the base with respect to the associated emitter. The biasing voltage would be overcome by the application of control voltages from the pulse generating means 200 or the transformer 70.

In summary, the regulator system 30 shown in FIG. 1 varies the voltage across a load circuit 32 supplied from a source of alternating current by statically changing the connections between the load circuit and a plurality of tap connections of a transformer by controlling the conduction state of a plurality of semiconductor switching devices, which in this case are switching transistors. The change or transfer of connections occurs naturally at a predetermined point during each half cycle of operation to thereby vary the effective or average voltage across the load circuit. In the regulator system 30, the predetermined point during each half cycle varies with the voltage across the load circuit 32 to thereby maintain the voltage across the load circuit 32 at a predetermined value.

It is to be understood that the teachings of this invention may be incorporated in an electrical control apparatus in which the voltage across a load circuit supplied from a source of alternating current is deliberately varied or controlled in response to an externally applied control signal or voltage rather than an error voltage as shown for the regulator system 30. In the latter case, the voltage across the load circuit would vary with the externally applied control signal, which would vary the predetermined point during each half cycle at which a change or transfer between at least first and second tap connections of a transformer and a load circuit was made.

It is also to be understood that an electrical control apparatus could be provided embodying the teachings of this invention which employed semiconductor switching devices to change the connection between a load circuit and a plurality of sources of alternating current rather than changing the connections between a load circuit and a plurality of tap connections on a transformer as disclosed. It is also readily appreciated that a regulator system incorporating the teachings of this invention could be modified to include various types of conventional line drop compensation and time delay circuits in order to obtain more desirable operating characteristics.

An electrical control apparatus of the type disclosed could include an autotransformer rather than a transformer having a plurality of windings and could be arranged in a three-phase system rather than in a single-phase system as disclosed. The semiconductor switching devices can also be arranged on the primary winding rather than the secondary side of a transformer as shown in FIG. 1. Although the load circuit 32, as illustrated in FIG. 1, includes rectifying means, specifically a full-wave rectifier 60, it will be readily appreciated that a load circuit connected to an electrical control apparatus as disclosed could be an alternating current load rather than a load employing unidirectional or direct current. Although the invention is illustrated using P-N-P junction type transistors, it is to be understood that the electrical control apparatus disclosed can be adapted for other types of transistors and for other types of semiconductor switching devices, such as semiconductor diodes and semiconductor devices having a plurality of elements or a plurality of leads or connections.

The apparatus embodying the teachings of this invention has several advantages. For example, the voltage across a load circuit can be continuously varied between first and second predetermined voltages associated with tap connections on a transformer or with different sources of alternating current. In addition, the electrical control apparatus disclosed may be incorporated in a regulator system for maintaining the voltage across a load circuit at a predetermined value. The static switching means employed as disclosed permits a smooth and continuous variation in a voltage across a load circuit without introducing appreciable losses or impedance and without introducing the voltage surges associated with step changes in voltage connections in conventional apparatus. Further, the static change in connections accomplished by the apparatus is disclosed in a substantially natural manner rather than occurring in a forced manner.

Since numerous changes may be made in the above-described apparatus and circuits, and different embodiments of the invention may be made without departing from the spirit thereof, it is intended that all the matter contained in the foregoing description or shown in the accompanying drawing shall be interpreted as illustrative and not in a limiting sense.

I claim as my invention:

1. In an electrical control apparatus for controlling the voltage across a load circuit supplied from a source of alternating current, in combination, a transformer including a winding having first and second tap connections connected between said source and said load circuit, the voltage associated with said first tap connection being higher than the voltage associated with said second tap connection, first and second pluralities of switching transistors each having an emitter, a collector and a base connected between said first and second tap connections, respectively, and the same side of said load circuit, the emitter-collector path of each of said transistors being connected between the associated tap connection and said load circuit to conduct and effectively connect the associated tap connection to said load circuit upon the application of control signals between the base and the emitter of each of said transistors, first means connected in circuit relation with said second plurality of transistors for providing control voltages between the base and the emitter of each of a portion of said second plurality of transistors during each half cycle of said alternating current to effectively connect said second tap connection to said load circuit, pulse generating means for providing control pulses each having a steep wave front between the base and the emitter of each of a portion of said first plurality of transistors to effectively connect the first tap connection to said load circuit at a predetermined point in each half cycle of said alternating current, and a separate diode connected in series circuit relation with each of said switching transistors between said load circuits and one of said tap connections, each diode being poled to block current in the associated switching transistor during alternate half cycles of said alternating current and to assist in the transfer of connections between said load circuits and said tap connections, the predetermined point in each half cycle at which said pulse gererating means provides a control pulse varying with an external control signal applied thereto, the effective voltage across said load circuit varying with said external control signal.

2. In an electrical control apparatus for controlling the voltage across a load circuit supplied from a source of alternating current, in combination, a transformer including a winding having first and second tap connections connected between said source and said load circuit, the voltage associated with said first tap connection being higher than the voltage associated with said second tap connection, first and second pluralities of semiconductor switching devices connected between said first and second tap connections and the same side of said load circuit, said devices being substantially non-conducting in the absence of control signals applied thereto, first means connected in circuit relation with said second plurality of devices for applying control voltages to a portion of said devices during each half cycle of said alternating current to render said portion of devices conducting and to effectively connect said second tap connection to said load circuit, and pulse generating means connected in circuit relation with said first plurality of devices for providing control pulses each having a steep wave front to a portion of the devices of said first plurality at a predetermined point during each half cycle of said alternating current to render said portion of devices conducting and to effectively change the connection between said second tap connection and said load circuit to a connection between said first tap connection and said load circuit, and a separate diode connected in series circuit relation with each of said switching devices between said load circuits and one of said tap connections, each diode being poled to block current in the associated switching device during alternate half cycles of said alternating current and to assist in the transfer of connections between said load circuits and said tap connections, the phase relation between said alternating current and the control pulses provided by said pulse generating means varying in response to an external control signal applied thereto to vary the voltage across said load circuit between the voltages associated with said first and second tap connections.

3. In a regulator system for maintaining at substantially a predetermined value the voltage across a load circuit supplied from first and second sources of alternating current each having one side connected to the same side of said load circuit, the combination comprising first and second pluralities of semiconductor switching devices connected between the other side of each of said first and second sources, respectively, and the other side of said load circuit, said devices being substantially non-conducting in the absence of control signals applied thereto, first means connected in circuit relation with said first plurality of devices for applying control voltage to a portion of the devices of said first plurality during each half cycle of said alternating current to render said portion of devices conducting and substantially connect said first source to said load circuit, error detecting means connected to said load circuit for obtaining an error voltage which is a measure of the deviation of the voltage across said load circuit from said predetermined value, and pulse generating means connected in circuit relation with said second plurality of devices for providing control pulses each having a steep wave front to a portion of said second plurality at a predetermined point during each half cycle of said alternating current to render said portion of said second plurality conducting and substantially change the connection of said load circuit from said first source to said second source during the balance of each half cycle, and a separate diode connected in series circuit relation with each of said semiconductor switching devices between said load circuit and one of said tap connections, each diode being poled to block current in the associated switching device during alternate half cycles of said alternating current and to assist in the transfer of connections between said load circuits and said tap connections, the predetermined point during each half cycle varying with said error voltage to maintain the voltage across said load circuit at substantially said predetermined value.

4. In a regulator system for maintaining at substantially a predetermined value the voltage across a load circuit supplied from a source of alternating current, the combination comprising a transformer including a winding having a tap connection intermediate the ends of said winding, one end of said winding being connected to one side of said load circuit, first and second pluralities of switching transistors connected between the other end of said winding and the other side of said load circuit and between said tap connection and the other side of said load circuit, respectively, each of said transistors having a base, an emitter and a collector with a portion of the emitter-collector paths of said transistors in each plurality connected to conduct on alternate half cycles of said alternating current upon the application of control signals between the base and the emitter of each of said transistors, first means connected in circuit relation with said second plurality of transistors for providing control voltages between the base and the emitter of each of a portion of said second plurality of transistors to render said portion of transistors conducting and substantially connect said tap connection to said load circuit, an error detecting means for obtaining an error voltage which is a measure of the deviation of the voltage across said load circuit from said predetermined value, and pulse generating means for providing control pulses each having a steep wave front between the base and the emitter of each of a portion of said first plurality of transistors to render said portion of transistors conducting and substantially change the connection between said winding and said load circuit from said tap connection to the other end of said winding at a predetermined point during each half cycle of said alternating current, and a separate diode connected in series circuit relation with each of said switching transistors between said load circuits and one of said tap connections, each diode being poled to block current in the associated switching transistor during alternate half cycles of said alternating current and to assist in the transfer of connections between said load circuits and said tap connections, the predetermined point in each half cycle varying with said error voltage to maintain the voltage across said load circuit at substantially said predetermined value.

5. In a regulator system for maintaining at substantially a predetermined value the voltage across a load circuit supplied from a source of alternating current, the combination comprising, a transformer including a winding having a tap connection intermediate the ends of said winding, one end of said winding being connected to one side of said load circuit, first and second pairs of switching transistors each having a base, a collector and an emitter connected between the other end of said winding and said load circuit and between said tap connection and said load circuit, respectively, the emitter-collector path of each transistor connected to conduct during alternate half cycles of said alternating current upon the application of control signals between the emitter and the base of each of said transistors, first means connected between the bases and the emitters of said second pair of transistors for providing control voltages to render each of said second pair of transistors conducting during alternate half cycles of said alternating current and to substantially connect said tap connection to said load circuit, error detecting means connected to said load circuit for obtaining an error voltage which is a measure of the deviation of the voltage across said load circuit from said predetermined value, and pulse generating means connected between the bases and the emitters of each of said first pair of transistors for providing control pulses each having a steep wave front to render each of said transistors conducting at a predetermined point during alternate half cycles of said alternating current and to substantially change the connection between said winding and said load from the other end of said winding to said tap connection, the phase relation between said alternating current and said control pulses varying with said error voltage to maintain the voltage across said load circuit at said predetermined value.

6. In an electrical control apparatus for controlling the voltage across a load circuit supplied from first and second sources of alternating current having first and second output voltages, first and second pluralities of semiconductor switching devices connected between one side of said first and second sources, respectively, and one side of said load circuit, the other side of said load circuit being connected to the other side of each of said first and second sources, said switching devices being substantially non-conducting in the absence of control signals applied thereto, first means for applying control voltages to a portion of said first plurality of devices during each half cycle of said alternating current to render said portion of devices conducting and effectively connect said first source to said load circuit, pulse generating means connected in circuit relation with said second plurality of devices for applying control pulses to a portion of said devices to render said portion of devices conducting and effectively connect said second source to said load circuit at a predetermined point in each half cycle of said alternating current, and a separate diode connected in series circuit relation with each of said semiconductor switching devices between said load circuit and one of said sources, each diode being poled to block current in the associated switching device during alternate half cycles of said alternating current and to assist in the transfer of connections between said load circuits and said sources, the predetermined point at which said pulse generating means applies said control pulses varying with an external control signal applied thereto, the voltage across said load circuit varying with the external control signal applied to said pulse generating means.

7. In an electrical control apparatus for controlling the voltage across a load circuit supplied from a source of alternating current, in combination, a transformer including a winding having first and second tap connections connected between said source and said load circuit, the voltage associated with said first tap connection being higher than the voltage associated with said second tap connection, first and second pluralities of switching transistors each having an emitter, a collector and a base connected between said first and second tap connections, respectively, and the same side of load circuit, the emitter-collector path of each of said transistors being connected between the associated tap connection and said load circuit to conduct and effectively connect the associated tap connection to said load circuit upon the application of control signals between the base and the emitter of each of said transistors, first means connected in circuit relation with said second plurality of transistors for providing control voltages between the base and the emitter of each of a portion of said second plurality of transistors during each half cycle of said alternating current to effectively connect said second tap connection to said load circuit, pulse generating means for providing control pulses between the base and the emitter of each of a portion of said first plurality of transistors to effectively connect the first tap connection to said load circuit at a predetermined point in each half cycle of said alternating current, and a separate diode connected in series circuit relation with each of said switching transistors between said load circuit and one of said tap connections, each diode being poled to block current in the associated switching transistor during alternate half cycles of said alternating current and to assist in the transfer of connections between said load circuits and said tap connections, the predetermined point in each half cycle at which said pulse generating means provides a control pulse varying with a control signal applied thereto, the effective voltage across said load circuit varying with said external control signal.

8. In a regulator system for maintaining at substantially a predetermined value the voltage across a load circuit supplied from a source of alternating current, the combination comprising, a transformer including a winding having first and second tap connections connected between said source and said load circuit, first and second pluralities of semiconductor switching devices connected between said first and second tap connections, respectively, and the same side of said load circuit, said devices being substantially non-conducting in the absence of control signals applied thereto, first means for applying control voltages to a portion of the devices of said first plurality at the beginning of each half cycle of said alternating current to render said devices conducting and effectively connect said first tap connection to said load circuit, error detecting means connected in circuit relation with said load circuit for obtaining an error voltage which is a measure of the deviation of the voltage across said load circuit from said predetermined value, pulse generating means connected in circuit relation between said error detecting means and said second plurality of devices for providing control pulses for a portion of said devices at a predetermined point during each half cycle to render said portion of devices conducting and effectively connect said second tap connection to said load circuit for the balance of the half cycle, and a separate diode connected in series circuit relation with each of said semiconductor switching devices between said load circuit and one of said tap connections, each diode being poled to block current in the associated switching device during alternate half cycles of said alternating current and to assist in the transfer of connections between said load circuits and said tap connections, the predetermined point during each half cycle varying with said error voltage to maintain the voltage across said load circuit at substantially said predetermined value.

9. In an electrical control apparatus for controlling the voltage across a load circuit supplied from first and second sources of alternating current having first and second output voltages, first and second pluralities of semiconductor switching devices connected between one side of said first and second sources, respectively, and one side of said load circuit, the other side of said load circuit being connected to the other side of each of said first and second sources, said switching devices being substantially non-conducting in the absence of control signals applied thereto, first means for applying control voltages to a portion of said first plurality of devices during each half cycle of said alternating current to render said portion of devices conducting and effectively connect said first source to said load circuit, and pulse generating means connected in circuit relation with said second plurality of devices for applying control pulses each having a steep wave front to a portion of said devices to render said portion of devices conducting and effectively connect said second source to said load circuit at a predetermined point in each half cycle of said alternating current, the predetermined point at which said pulse generating means applies said control pulses varying with an external control signal applied thereto, the voltage across said load circuit varying with the external control signal applied to said pulse generating means.

10. In an electrical control apparatus for controlling the voltage across a load circuit supplied from a source of alternating current, in combination, a transformer including a winding having first and second tap connections connected between said source and said load circuit, the voltage associated with said first tap connection being higher than the voltage associated with said second tap connection, first and second pluralities of switching transistors each having an emitter, a collector and a base connected between said first and second tap connections, respectively, and the same side of said load circuit, the emitter-collector path of each of said transistors being connected between the associated tap connection and said load circuit to conduct and effectively connect the associated tap connection to said load circuit upon the application of control signals between the base and the emitter of each of said transistors, first means connected in circuit relation with said second plurality of transistors for providing control voltages between the base and the emitter of each of a portion of said second plurality of transistors during each half cycle of said alternating current to effectively connect said second tap connection to said load circuit, and pluse generating means for providing control pulses each having a steep wave front between the base and the emitter of each of a portion of said first plurality of transistors to effectively connect the first tap connection to said load circuit at a predetermined point in each half cycle of said alternating current, the predetermined point in each half cycle at which said pulse generating means provides a control pulse varying with a control signal applied thereto, the effective voltage across said load circuit varying with said external control signal.

11. In a regulator system for maintaining at substantially a predetermined value the voltage across a load circuit supplied from a source of alternating current, the combination comprising, a transformer including a winding having first and second tap connections connected between said source and said load circuit, first and second pluralities of semiconductor switching devices connected between said first and second tap connections, respectively, and the same side of said load circuit, said devices being substantially non-conducting in the absence of control signals applied thereto, first means for applying control voltages to a portion of the devices of said first plurality at the beginning of each half cycle of said alternating current to render said devices conducting and effectively connect said first tap connection to said load circuit, error detecting means connected in circuit relation with said load circuit for obtaining an error voltage which is a measure of the deviation of the voltage across said load circuit from said predetermined value, and pulse generating means connected in circuit relation between said error detecting means and said second plurality of devices for providing control pulses each having a steep wave front for a portion of said devices at a predetermined point during each half cycle to render said portion of said second plurality conducting and substantially change the connection of said load circuit from said first source to said second source during the balance of each half cycle, the predetermined point during each half cycle varying with said error voltage to maintain the voltage across said load circuit at substantially said predetermined value.

References Cited in the file of this patent
UNITED STATES PATENTS

| | | |
|---|---|---|
| 1,914,193 | Bedford | June 13, 1933 |
| 2,698,416 | Sherr | Dec. 28, 1954 |
| 2,740,086 | Evans | Mar. 27, 1956 |
| 2,806,963 | Woll | Sept. 17, 1957 |
| 2,884,545 | Houck | Apr. 28, 1959 |